United States Patent
Nakatsugawa

(10) Patent No.: US 6,728,245 B1
(45) Date of Patent: Apr. 27, 2004

(54) COMMUNICATION METHOD, COMMUNICATION SYSTEM, AND GATEWAY USED FOR THE COMMUNICATION SYSTEM

(75) Inventor: Yoshinori Nakatsugawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/495,458

(22) Filed: Feb. 1, 2000

(30) Foreign Application Priority Data

Feb. 10, 1999 (JP) ............................................. 11-033311

(51) Int. Cl.[7] .......................... H04L 12/28; H04L 12/66; G06F 15/16
(52) U.S. Cl. ........................ 370/392; 370/401; 709/238; 709/245; 709/249
(58) Field of Search ................................. 370/229, 230, 370/231, 235, 254, 351, 389, 392, 401, 402, 403, 404, 405; 709/238, 245, 246, 249

(56) References Cited

U.S. PATENT DOCUMENTS 5,394,556 A  2/1995  Oprescu ...................... 395/800

FOREIGN PATENT DOCUMENTS

| EP | 0 436 932 | 7/1991 |
| EP | 0 887 980 A2 | 12/1998 |
| EP | 0 903 893 A2 | 3/1999 |
| JP | 59-62245 | 4/1984 |
| JP | 10-294751 | 11/1998 |
| JP | 11-17718 | 1/1999 |

*Primary Examiner*—Alpus H. Hsu
(74) *Attorney, Agent, or Firm*—Finnegan, Henderson, Farabow, Garrett & Dunner, L.L.P.

(57) ABSTRACT

When data is exchanged between a pair of LANs (3, 5) via a pair of route hubs (RH4, RH6), one of the route hubs (RH4) sends an address assignment frame to a first LAN (3) in a clockwise direction, assigns an address to each route hub (RH) and each node terminal (N), based on an address value, sequentially from the route hub (RH1) to route hub (RH4), and sends the address assignment frame, which has been returned, to the other route hub (RH6) of the pair. The other route hub (RH6) assigns the address to itself based on the address value contained in the received address assignment frame, sends the address assignment frame to a second LAN (5) in the clockwise direction, assigns the address to each route hub (RH) and each node terminal (N), based on the address value, sequentially from the route hub (RH7), and returns the address assignment frame, which has been returned, to the route hub (RH4). Thus, addresses are automatically assigned to each route hub (RH) and node terminal (N). Upon receiving communication data to be sent to a destination, each of the pair of route hubs (RH4, RH6) selects a route via which the communication data is to be sent, and for sending the communication data to the destination via the selected route.

11 Claims, 10 Drawing Sheets

FIG. 7

| FIRST LAN | | SECOND LAN | |
|---|---|---|---|
| RH ADDRESS | NODE ADDRESS | RH ADDRESS | NODE ADDRESS |
| (RH1) 01 | (N1) 02 | (RH6) 10 | (N6) 11 |
| (RH2) 03 | (N2) 04 | (RH7) 12 | (N7) 13 |
| (RH3) 05 | (N3) 06 | (RH8) 15 | (N8) 14 |
| | | | (N9) 16 |
| (RH4) 07 | (N4) 08 | (RH9) 17 | (N10) 18 |

COMMUNICATION METHOD, COMMUNICATION SYSTEM, AND GATEWAY USED FOR THE COMMUNICATION SYSTEM

BACKGROUND OF THE INVENTION

1. Field of the Invention

The present invention relates to a communication method for exchanging data between node terminals, between routers, and between a node terminal and a router, for use in a communication system composed of a pair of networks which are connected by data transmission lines via a gateway and each of which has a plurality of routers each having one or more node terminals. In particular, the present invention relates to a communication method, a communication system, and a gateway used in the communication system that automatically assign addresses to routers and node terminals to reliably send communication data to destinations while significantly increasing the per-unit-time transmission amount.

2. Description of the Related Art

Conventionally, a communication system, such as the one disclosed in Japanese Patent Laid-Open Publication No. Sho 59-62245, is known in which LANs (Local Area Network), each of which allows a plurality of stations to exchange data, are connected via a gateway for data exchange between a pair of LANs.

In the technology disclosed in the above publication, a sender/receiver address specifying the data sender and receiver, as well as the station address indicating the station to or from which data is sent or received and the network address indicating the network to which the station belongs, is added to communication data. During data communication, this address is referenced to reliably send data between LANs even when data is transferred across networks.

However, because there are many types of addresses that are added to communication data used in the conventional communication system described above, a relatively large data description area must be reserved for the address description area within the data communication data. The need to reserve a large data description area prevents per-unit-time data transmission amount from increasing, offering a problem that must be solved.

The communication method, the communication system, and the gateway used in the communication system disclosed in Japanese Patent Laid-Open Publication No. Hei 10-294751 are known as a solution to this problem. The method disclosed in this publication is used in a communication system composed of a pair of networks which are connected by data transmission lines via a gateway and each of which has a plurality of routers each having one or more node terminals. When data is exchanged between node terminals, between routers, and between a node terminal and a router, the router writes the source/destination addresses in the address description area in the communication data in advance and then sends the communication data, in which the source/destination addresses are described, to the destination.

On the other hand, the gateway decodes the source/destination addresses included in the received communication data, checks if the destination and the source are in the same network based on the decoded source/destination addresses and the previously-stored network identification data, selects an appropriate route for the destination of the communication data based on the network identification checking, and then sends the communication data to the destination via the selected route.

Therefore, by simply storing the source/destination addresses in a small address description area provided in the communication data, this method significantly increases the per-unit-time data transmission amount and, at the same time, reliably sends communication data.

However, although the communication method, the communication system, and the gateway used in the communication system disclosed in Japanese Patent Laid-Open Publication No. Hei 10-294751 are used to exchange data between a pair of networks configured in the shape of the numeral 8, no method is disclosed for automatically assigning addresses to the routers and node terminals belonging to each network of the pair.

SUMMARY OF THE INVENTION

It is an object of the present invention to provide a communication method, a communication system, and a gateway used in the communication system that can automatically assign addresses to routers and node terminals, check, with the use of the assigned addresses, which network the communication data is to be addressed to, and reliably send the communication data to the destination while significantly increasing the per-unit-time data transmission amount.

To achieve the above object, there is provided a communication method for exchanging data between node terminals, between routers, or between a node terminal and a router using a communication system composed of a pair of networks each comprising a plurality of routers each having one or more the node terminals, the plurality of routers being connected via a first data transmission line, the pair of networks being connected via a pair of routers belonging to the pair of networks respectively and a second data transmission line connecting the pair of routers, the communication method comprising the steps of: causing one of the pair of routers to send into one direction an address assignment frame containing an address value to one of the pair of networks, to assign an address to each router and each node terminal, based on the address value, sequentially from the router, which is nearest to the one of pairs of routers, to the one of pairs of routers itself, and to send the address assignment frame, which has been returned, to the other router of the pair of routers; and causing the other router of the pair of routers to assign the address to itself based on the address value contained in the received address assignment frame, to send the address assignment frame to the other network into the one direction, to assign the address to each router and each node terminal, based on the address value, sequentially from the router which is nearest to the other router, and to return the address assignment frame, which has been returned, to the one of the pair of routers.

According to this invention, one of the pair of routers sends into one direction an address assignment frame containing an address value to one of the pair of networks, assigns an address to each router and each node terminal, based on the address value, sequentially from the router, which is nearest to the one of pairs of routers, to the one of pairs of routers itself, and sends the address assignment frame, which has been returned, to the other router of the pair of routers. The other router of the pair of routers assigns the address to itself based on the address value contained in the received address assignment frame, sends the address assignment frame to the other network into the one direction, assigns the address to each router and each node terminal, based on the address value, sequentially from the router which is nearest to the other router, and returns the address assignment frame, which has been returned, to the one of the pair of routers. Therefore, addresses may be assigned automatically to the routers and the node terminals belonging to the pair of networks.

In a preferred embodiment of the present invention, each of the routers adds at least a destination address to communication data to be sent and sends the communication data containing the destination address to a destination, and each of the pair of routers checks, based on the destination address contained in received communication data and the address assigned to itself, if the destination is included in the network to which the router itself belongs, selects, based on a result of the checking, a route via which the communication data is to be sent, and sends the communication data to the destination via the selected route.

In this mode, each of the routers adds at least a destination address to communication data to be sent and sends the communication data containing the destination address to a destination, and each of the pair of routers checks, based on the destination address contained in received communication data and the address assigned to itself, if the destination is included in the network to which the router itself belongs, selects, based on a result of the checking, a route via which the communication data is to be sent, and sends the communication data to the destination via the selected route. Therefore, communication data may be sent reliably to the destination while significantly increasing the per-unit-time data transmission amount.

In a preferred embodiment of the present invention, when assigning the address to each of the routers and the node terminals, each of the pair of routers increments or decrements the address.

In this mode, because each of the pair of routers increments or decrements the address when assigning the address to each router and each node terminal, it is easily determined which network the destination belongs to by comparing the destination address with the address of the router itself.

To achieve the above object, there is provided a communication system which is composed of a pair of networks each comprising a plurality of routers each having one or more node terminals and in which data is exchanged between the node terminals, between the routers, or between a node terminal and a router, the plurality of routers being connected via a first data transmission line, the pair of networks being connected via a pair of routers belonging to the pair of networks respectively and a second data transmission line connecting the pair of routers, wherein one of the pair of routers has first address assignment means for sending into one direction an address assignment frame containing an address value to one of the pair of networks, for assigning an address to each router and each node terminal, based on the address value, sequentially from the router, which is nearest to the one of pairs of routers, to the one of pairs of routers itself, and for sending the address assignment frame, which has been returned, to the other router of the pair of routers; and wherein the other router of the pair of routers has second address assignment means for assigning the address to itself based on the address value contained in the received address assignment frame, for sending the address assignment frame to the other network into the one direction, for assigning the address to each router and each node terminal, based on the address value, sequentially from the router which is nearest to the other router, and for returning the address assignment frame, which has been returned, to the one of the pair of routers.

According to this invention, the first address assignment means provided by one of the pair of routers sends into one direction an address assignment frame containing an address value to one of the pair of networks, assigns an address to each router and each node terminal, based on the address value, sequentially from the router, which is nearest to the one of pairs of routers, to the one of pairs of routers itself, and sends the address assignment frame, which has been returned, to the other router of the pair of routers. The second address assignment means provided by the other router of the pair of routers assigns the address to itself based on the address value contained in the received address assignment frame, sends the address assignment frame to the other network into the one direction, assigns the address to each router and each node terminal, based on the address value, sequentially from the router which is nearest to the other router, and returns the address assignment frame, which has been returned, to the one of the pair of routers. Therefore, addresses may be assigned automatically to the routers and the node terminals belonging to the pair of networks.

In a preferred embodiment of the present invention, each of the routers has sending means for adding at least a destination address to communication data to be sent and for sending the communication data containing the destination address to a destination, and each of the pair of routers comprises: checking means for checking, based on the destination address contained in received communication data and its own address stored in the storing means, if the destination is included in the network to which the router itself belongs; and route selection means for selecting, based on a result of the checking, a route via which the communication data is to be sent and for sending the communication data to the destination via the selected route.

In this mode, the sending means provided by each of the routers adds at least a destination address to communication data to be sent and sends the communication data containing the destination address to a destination. In each of the pair of routers, the checking means checks, based on the destination address contained in received communication data and its own address stored in the storing means, if the destination is included in the network to which the router itself belongs, and the route selection means selects, based on a result of the checking, a route via- which the communication data is to be sent and sends the communication data to the destination via the selected route. Therefore, communication data may be sent reliably to the destination while significantly increasing the per-unit-time data transmission amount.

In a preferred embodiment of the present invention, when assigning the address to each of the routers and the node terminals, each of the pair of routers increments or decrements the address.

In this mode, because each of the pair of routers increments or decrements the address when assigning the address to each router and each node terminal, it is easily determined which network the destination belongs to by comparing the destination address with the address of the router itself.

To achieve the above object, there is provided a communication method for exchanging data between node terminals, between routers, or between a node terminal and a router using a communication system composed of a pair of networks each comprising a plurality of routers each having one or more the node terminals, the plurality of routers being connected via a data transmission line, the pair of networks being connected via a gateway, the communication method comprising the steps, by the gateway, of sending into one direction an address assignment frame containing an address value to one of the pair of networks; assigning an address to each router, each node terminal, and the gateway itself, based on the address value, sequentially from the router, which is nearest to the gateway, to the gateway itself; sending the address assignment frame to the other route network into the one direction; and assigning the address to each router and each node terminal, based on the address value, sequentially from the router which is nearest to the gateway.

According to this invention, the gateway sends into one direction an address assignment frame containing an address value to one of the pair of networks, assigns an address to each router, each node terminal, and the gateway itself, based on the address value, sequentially from the router, which is nearest to the gateway, to the gateway itself, sends the address assignment frame to the other route network into the one direction, and assigns the address to each router and each node terminal, based on the address value, sequentially from the router which is nearest to the gateway. Therefore, addresses may be assigned to the routers and the node terminals, belonging to the pair of networks, automatically and more speedily.

In a preferred embodiment of the present invention, each of the routers adds at least a destination address to communication data to be sent and sends the communication data containing the destination address to a destination, and the gateway checks, based on the destination address contained in received communication data and the address assigned to the gateway itself, which network the destination belongs to, selects, based on a result of the checking, a route via which the communication data is to be sent, and sends the communication data to the destination via the selected route.

In this mode, each of the routers adds at least a destination address to communication data to be sent and sends the communication data containing the destination address to a destination. The gateway checks, based on the destination address contained in received communication data and the address assigned to the gateway itself, which network the destination belongs to, selects, based on a result of the checking, a route via which the communication data is to be sent, and sends the communication data to the destination via the selected route. Therefore, communication data may be sent reliably to the destination while significantly increasing the per-unit-time data transmission amount.

In a preferred embodiment of the present invention, when assigning the address to each of the routers, each of the node terminals, and the gateway, the gateway increments or decrements the address.

In this mode, because the gateway increments or decrements the address when assigning the address to each router, each node terminal, and to the gateway, it is easily determined which network the destination belongs to by comparing the destination address with the address of the gateway itself.

To achieve the above object, there is provided a communication system which is composed of a pair of networks each comprising a plurality of routers each having one or more node terminals and in which data is exchanged between the node terminals, between the routers, or between a node terminal and a router, the plurality of routers being connected via a data transmission line, the pair of networks being connected via a gateway, wherein the gateway has address assignment means for sending into one direction an address assignment frame containing an address value to one of the pair of networks, for assigning an address to each router, each node terminal, and the gateway itself, based on the address value, sequentially from the router, which is nearest to the gateway, to the gateway itself, for sending the address assignment frame to the other network into the one direction, and for assigning the address to each router and each node terminal, based on the address value, sequentially from the router which is nearest to the gateway.

According to this invention, the address assignment means provided by the gateway sends into one direction an address assignment frame containing an address value to one of the pair of networks, assigns an address to each router, each node terminal, and the gateway itself, based on the address value, sequentially from the router, which is nearest to the gateway, to the gateway itself, sends the address assignment frame to the other network into the one direction, and assigns the address to each router and each node terminal, based on the address value, sequentially from the router which is nearest to the gateway. Therefore, addresses may be assigned to the routers and the node terminals, belonging to the pair of networks, automatically and more speedily.

To achieve the above object, there is provided a gateway for use in a communication system in which a pair of networks, each comprising a plurality of routers each having one or more the node terminals, are connected so that data may be exchanged between the node terminals, between the routers, or between a node terminal and a router, the plurality of routers being connected via a data transmission line, the gateway comprising: address assignment means for sending into one direction an address assignment frame containing an address value to one of the pair of networks, for assigning an address to each router, each node terminal, and the gateway itself, based on the address value, sequentially from the router, which is nearest to the gateway, to the gateway itself, for sending the address assignment frame to the other network into the one direction, and for assigning the address to each router and each node terminal, based on the address value, sequentially from the router which is nearest to the gateway; storing means for storing its own address assigned by the address assignment means; checking means for checking, based on the destination address contained in received communication data and its the own address stored in the storing means, which network the destination belongs to; and route selection means for selecting, based on a result of the checking, a route via which the communication data is to be sent, and for sending the communication data to the destination via the selected route.

According to this invention, the address assignment means sends into one direction an address assignment frame containing an address value to one of the pair of networks, and assigns an address to each router, each node terminal, and the gateway itself, based on the address value, sequentially from the router, which is nearest to the gateway, to the gateway itself. Then the address assignment means sends the address assignment frame to the other network into the one direction, and assigns the address to each router and each node terminal, based on the address value, sequentially from the router which is nearest to the gateway. The checking means checks, based on the destination address contained in received communication data and its the own address stored in the storing means, which network the destination belongs to. The route selection means selects, based on a result of the checking, a route via which the communication data is to be sent, and sends the communication data to the destination via the selected route. Therefore, addresses may be assigned to the routers and the node terminals, belonging to the pair of networks, automatically and more speedily. In addition, communication data may be sent reliably to the destination while significantly increasing the per-unit-time data transmission amount.

The nature, principle and utility of the invention will become more apparent from the following detailed description when read in conjunction with the accompanying drawings.

BRIEF DESCRIPTION OF THE DRAWINGS

In the accompanying drawings:

FIG. 7 is a diagram showing an example of addresses assigned to route hubs and node terminals.

DESCRIPTION OF THE PREFERRED EMBODIMENTS

A communication method, a communication system, and a gateway used in the communication system according to the present invention will be described below in detail with reference to the accompanying drawings.

<First embodiment>

Figure 1:
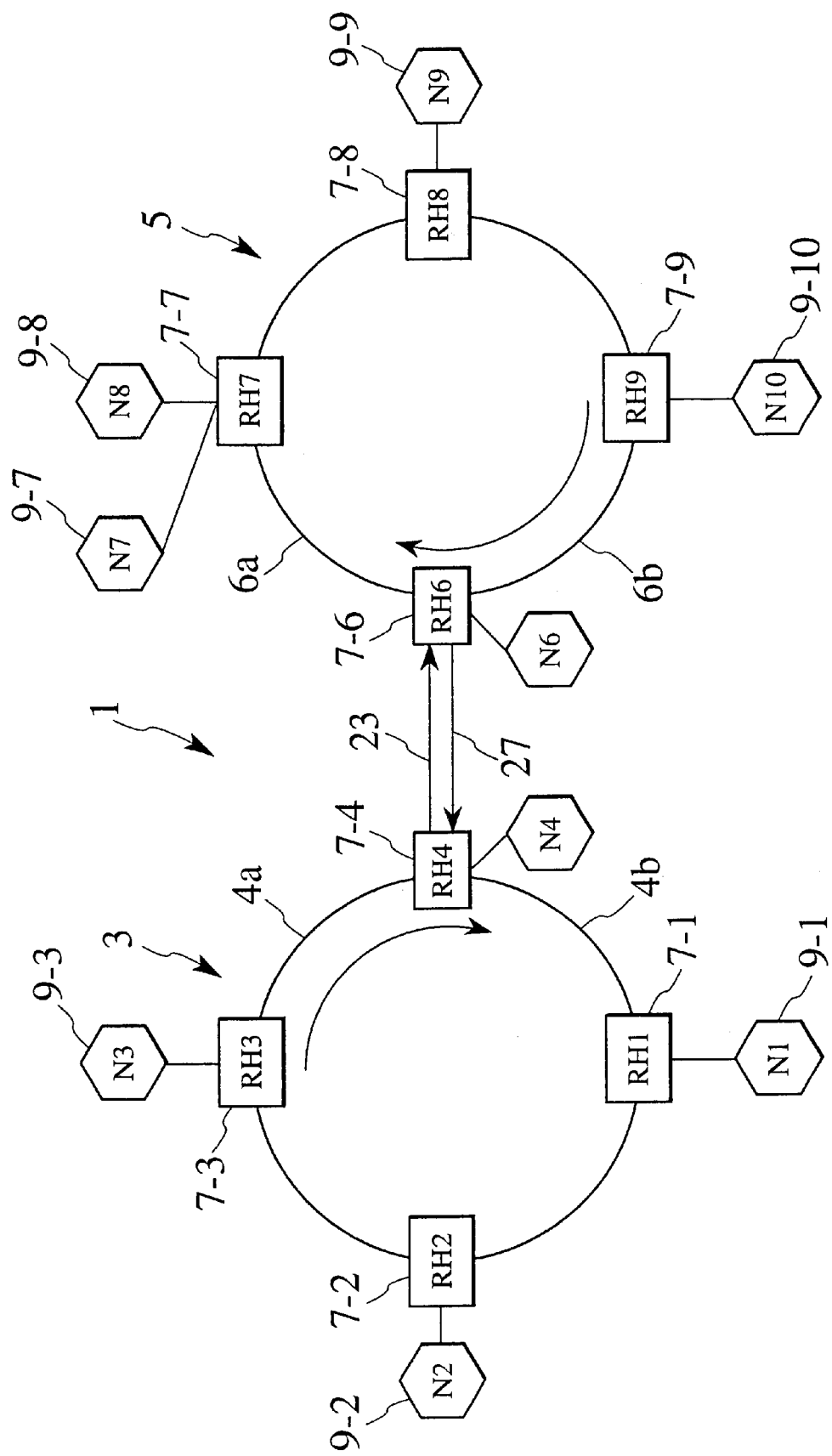
FIG. 1 is an overall block diagram showing the configuration of a communication system used in a first embodiment of the present invention.

Referring to FIG. 1, a communication system 1 used in a first embodiment according to the present invention comprises a first LAN 3 and a second LAN 5 which are connected via route hubs RH4 and RH6 so that data can be exchanged between two LANs. The first LAN 3 has route hubs 7-1 (RH1) to 7-4 (RH4) connected via a loop-type data transmission line 4, and the second LAN 5 has route hubs 7-6 (RH6) to 7-9 (RH9) connected via a loop-type data transmission line 6. Route hubs RH4 and RH6 are connected by data transmission lines 23 and 27. It should be noted that the network topology of the first LAN 3 and the second LAN 5 need not always be a loop; it may be, for example, one of other topologies such as a bus or a star.

Figure 2:
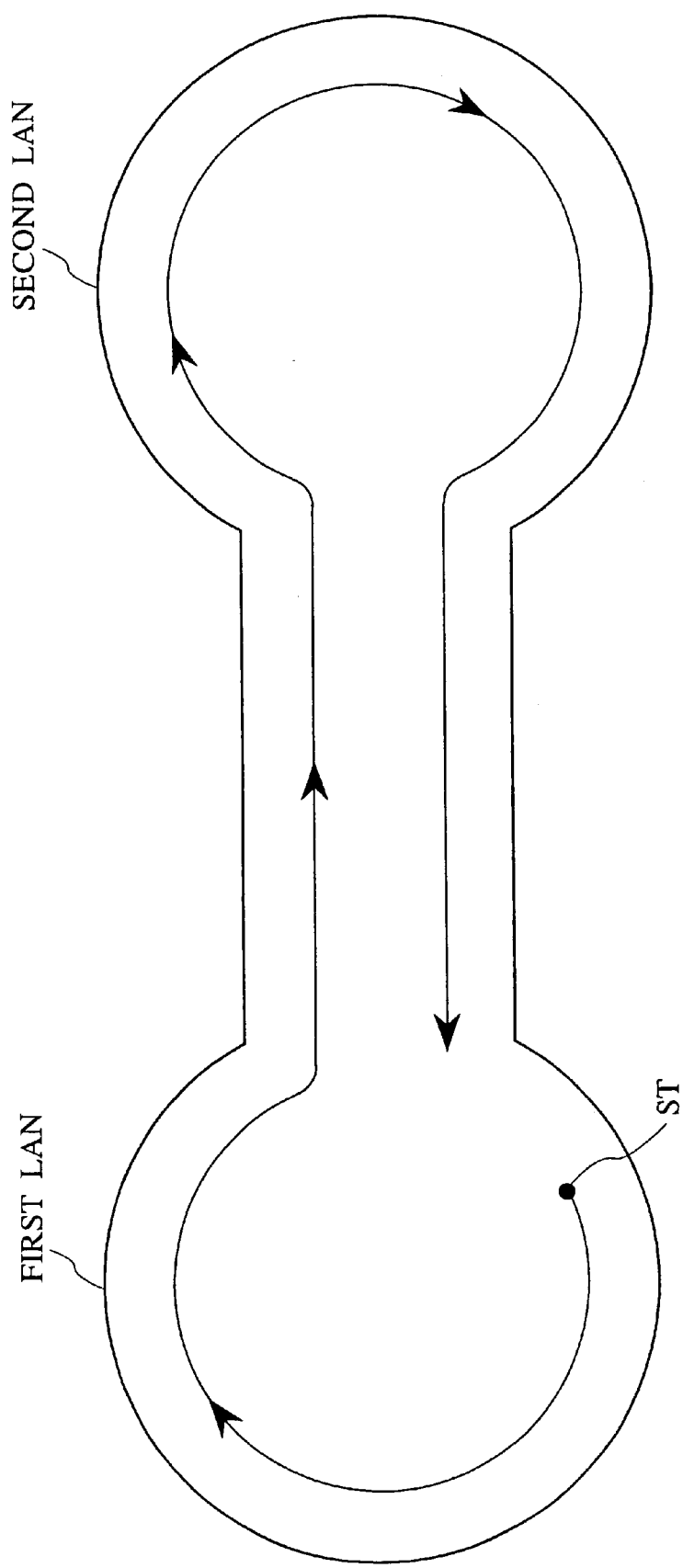
FIG. 2 is a schematic diagram showing the communication route of the communication system according to the present invention.

One or more node terminals are connected to each of the plurality of route hubs. In the figure, terminals are represented as N1, ..., N4, N6, ..., N10. The communication system is configured so that communication data may be exchanged between route hubs RH, between node terminals N, and between a node terminal N and a route hub RH, for example, in the arrow direction shown in FIG. 1, via the loop-type data transmission line, regardless of whether or not the destination and the source are in the same LAN. Also, addresses are assigned by assuming a one-loop transmission route, as shown in FIG. 2, for the whole communication system including the first LAN 3, second LAN 5, data transmission line 23, and data transmission line 27.

When the communication system according to the present invention is applied, for example, to an automobile communication system in which digital audio data is exchanged, any of the following functional units may be used, as necessary, as the node terminal N. They include a cellular phone, a facsimile (FAX), a digital TV, radio receiver, a navigation system (NV), a DVD(Digital Video Disc or Digital Versatile Disc)-ROM unit, a CD(Compact Disc)-ROM unit, a DAT (Digital Audio Tape recorder), an MD (Mini Disc), a digital signal processor (DSP) built-in audio amplifier, a CAN (Controller Area Network) interface, sensors such as a directional sensor or a speed sensor, a monitor, and a personal computer installed in a car.

Route hub RH4 and route hub RH6 each have the gateway function. Route hub RH4 sends an address assignment frame, which contains an address value, to the first LAN 3 in the clockwise direction and, using the address value, assigns addresses to the route hubs and the node terminals sequentially from route hub RH1, which is nearest to route hub RH4, to route hub RH4 itself. Upon receiving the address assignment frame that has been returned, route hub RH4 sends it to route hub RH6.

When route hub RH6 receives the address assignment frame, it assigns to itself the address value indicated by the received frame. Then, route hub RH6 sends the address assignment frame to the second LAN 5 in the clockwise direction and, using the address value, assigns addresses to the route hubs and the node terminals sequentially from route hub RH7 which is nearest to route hub RH6. Upon receiving the address assignment frame that has been returned, route hub RH6 sends it back to route hub RH4.

In this way, a unique address is assigned to each of route hubs RH1, ..., RH4, RH6, ... RH9 and each of node terminals N1, ..., N4, N6, ..., N10. The addresses thus assigned to the route hubs (RH) and node terminals (N) are used, as will be described later, when destination addresses or source addresses are described. At the same time, they are used to determine which LAN a route hub (RH) or a node terminal N (N) belongs to.

Figure 3:
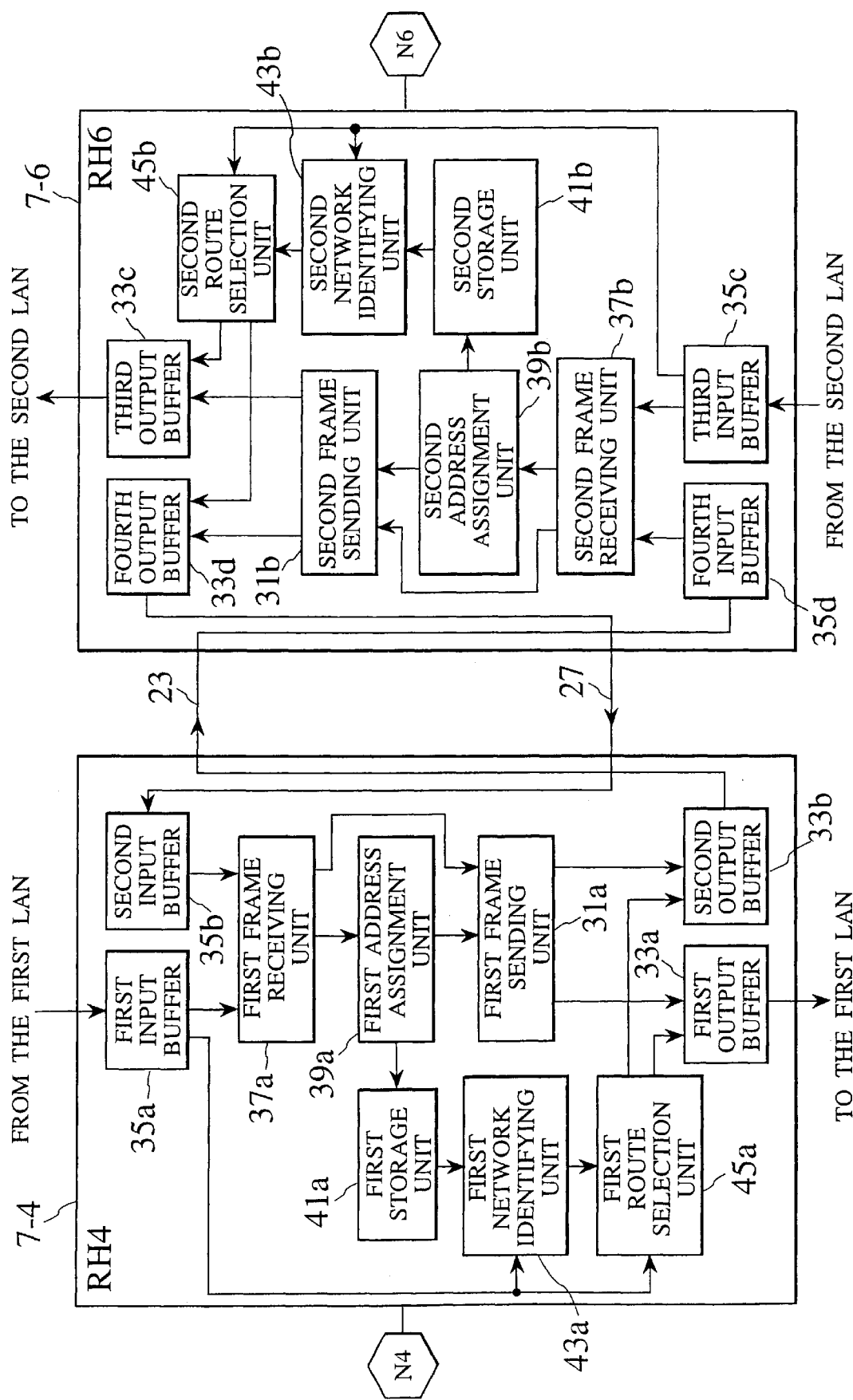
FIG. 3 is a block diagram showing the main part of the communication system used in the first embodiment of the present invention.

As shown in FIG. 3, route hub RH4 comprises a first frame sending unit 31a that sends the address assignment frame containing an address value, a first output buffer 33a in which data or the address assignment frame to be output to the first LAN 3 is temporarily stored, a second output buffer 33b in which data or the address assignment frame to be output to the data transmission line 23 is temporarily stored, a first input buffer 35a in which data or the address assignment frame received from the first LAN 3 is temporarily stored, a second input buffer 35b in which data or the address assignment frame received from the data transmission line 27 is temporarily stored, a first frame receiving unit 37a that receives the address assignment frame, and a first address assignment unit 39a that stores the address value included in the received address assignment frame into a first storage unit 41a.

Route hub RH4 further comprises the first storage unit 41a in which its own address and the node addresses of a plurality of node terminals connected to its own route hub, both of which are assigned by the first address assignment unit 39a, are stored, a first network identifying unit 43a that checks if the destination belongs to its own LAN based on the destination address added to the communication data received from a node terminal N or a route hub RH belonging to the first LAN 3 and on its own address stored in the first storage unit 41a, and a first route selection unit 45a that selects an appropriate route as the destination of communication data according to the result of the network identification so that the communication data may be sent via the selected route.

As shown in FIG. 3, route hub RH6 comprises a second frame sending unit 31b that sends the address assignment frame, a third output buffer 33c in which data or the address assignment frame to be output to the second LAN 5 is temporarily stored, a fourth output buffer 33d in which data or the address assignment frame to be output to the data transmission line 27 is temporarily stored, a third input buffer 35c in which data or the address assignment frame received from the second LAN 5 is temporarily stored, a fourth input buffer 35d in which data or the address assignment frame received from the data transmission line 23 is temporarily stored, a second frame receiving unit 37b that receives the address assignment frame, and a second address assignment unit 39b that stores the address value included in the received address assignment frame into a second storage unit 41b.

Route hub RH6 further comprises the second storage unit 41b in which its own address and the node addresses of a plurality of node terminals N connected to its own route hub, both of which are assigned by the second address assignment unit 39b, are stored, a second network identifying unit 43b that checks if the destination belongs to its own LAN based on the destination address added to the communication data received from a node terminal N or a route hub RH belonging to the second LAN 5 and on its own address stored in the second storage unit 41b, and a second route selection unit 45b that selects an appropriate route as the destination of communication data according to the result of the network identification so that the communication data is sent via the selected route.

Figure 4:
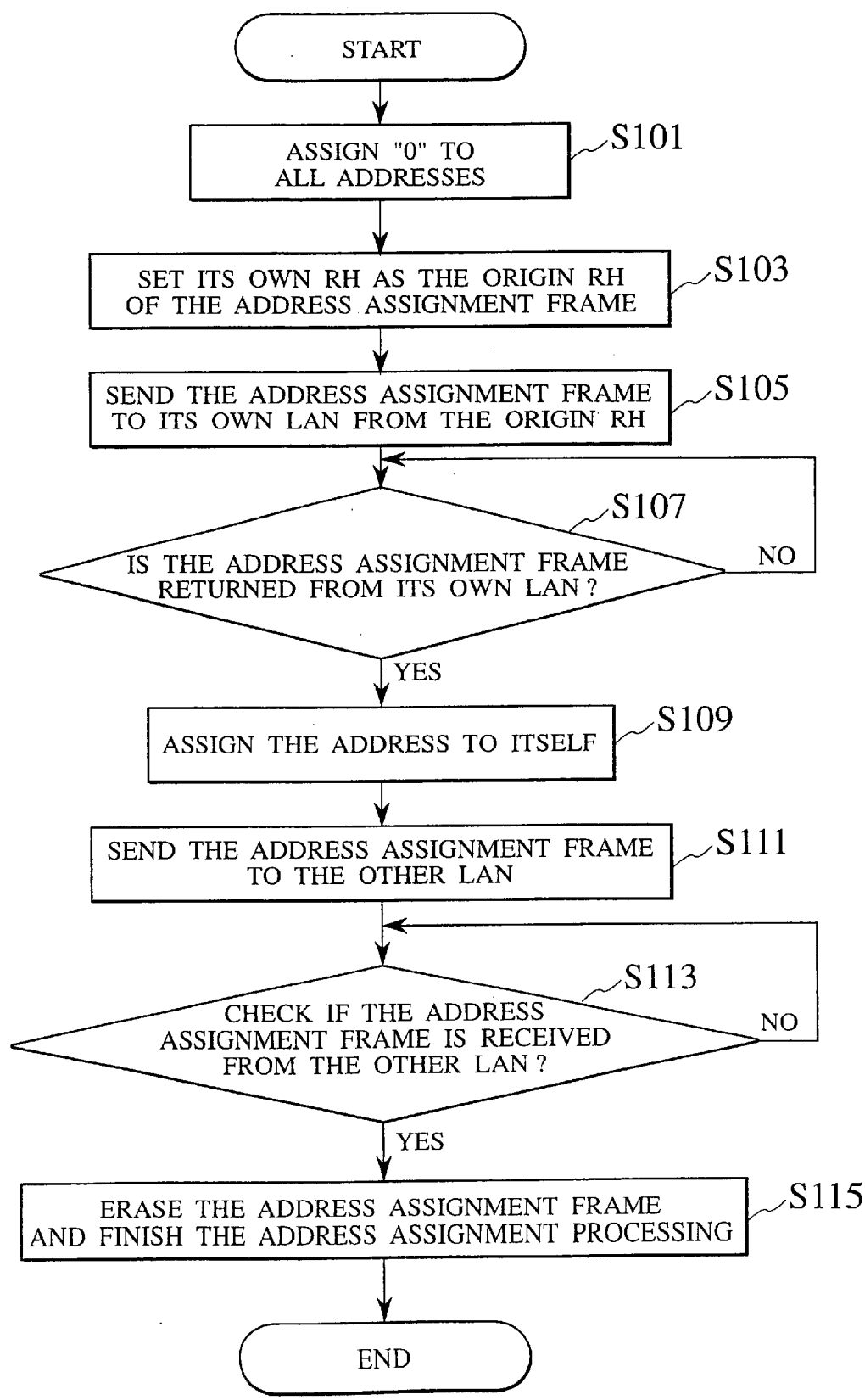
FIG. 4 is a flowchart showing the address assignment procedure for one of the route hubs performing the gateway function.

Next, referring to FIGS. 4 to 6, the address assignment procedure for the communication system, configured in accordance with the present invention, will be described. FIG. 4 is a flowchart showing the address assignment processing for route hub RH4, FIG. 5 is a flowchart showing the address assignment processing for route hubs other than route hubs RH4 and RH6, and FIG. 6 is a flowchart showing the address assignment processing of route hub RH6.

First, in the flowchart shown in FIG. 4, route hub RH4 assigns "0" to all addresses (step S101) and sets its own RH as the origin RH of the address assignment frame (step S103). Then, the first frame sending unit 31a sends the address assignment frame, which contains an address value (for example, "0"), to the first LAN 3 in the clockwise direction via the first output buffer 33a (step S105).

Figure 5:
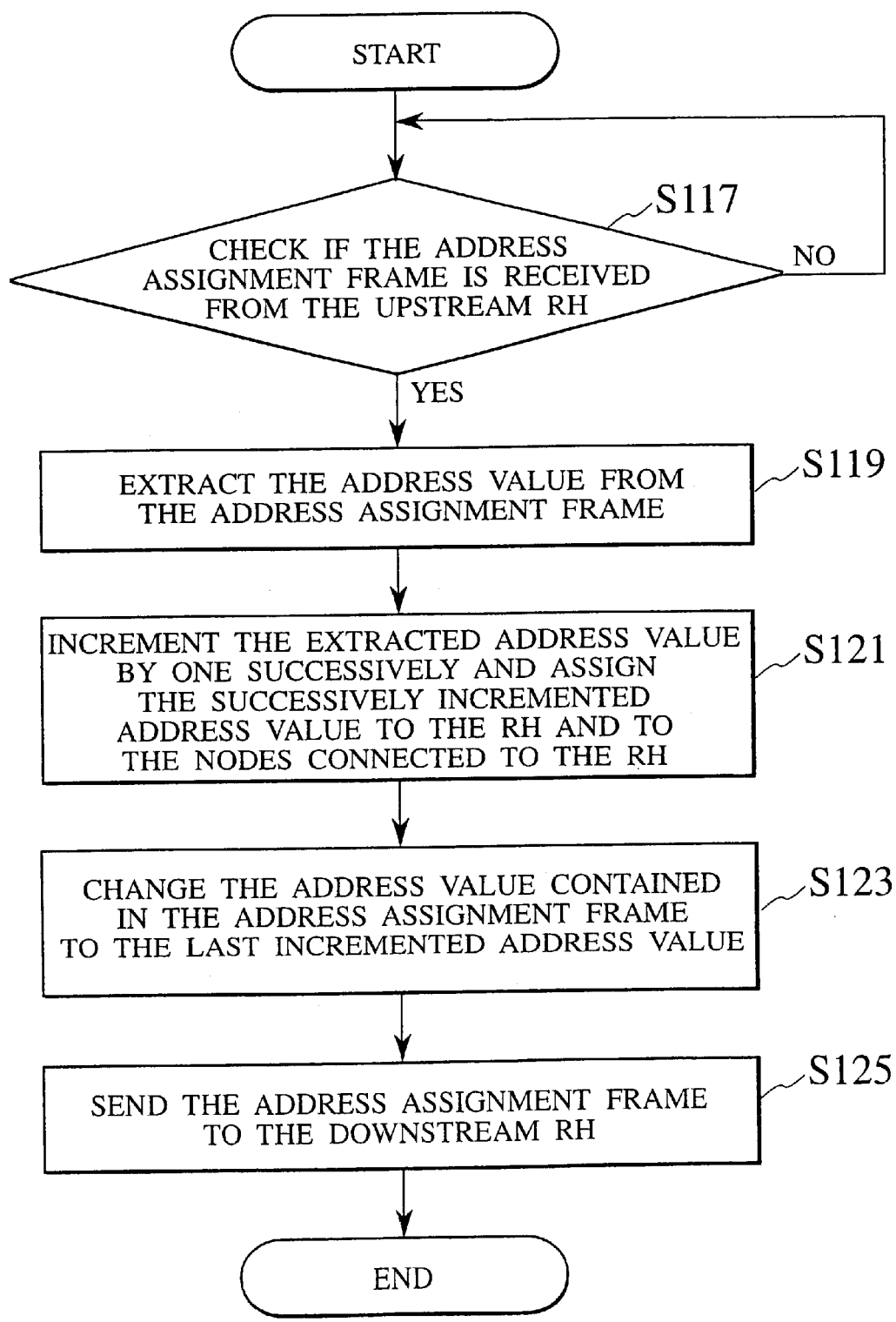
FIG. 5 is a flowchart showing the address assignment procedure for route hubs other than those having the gateway function.
Figure 6:
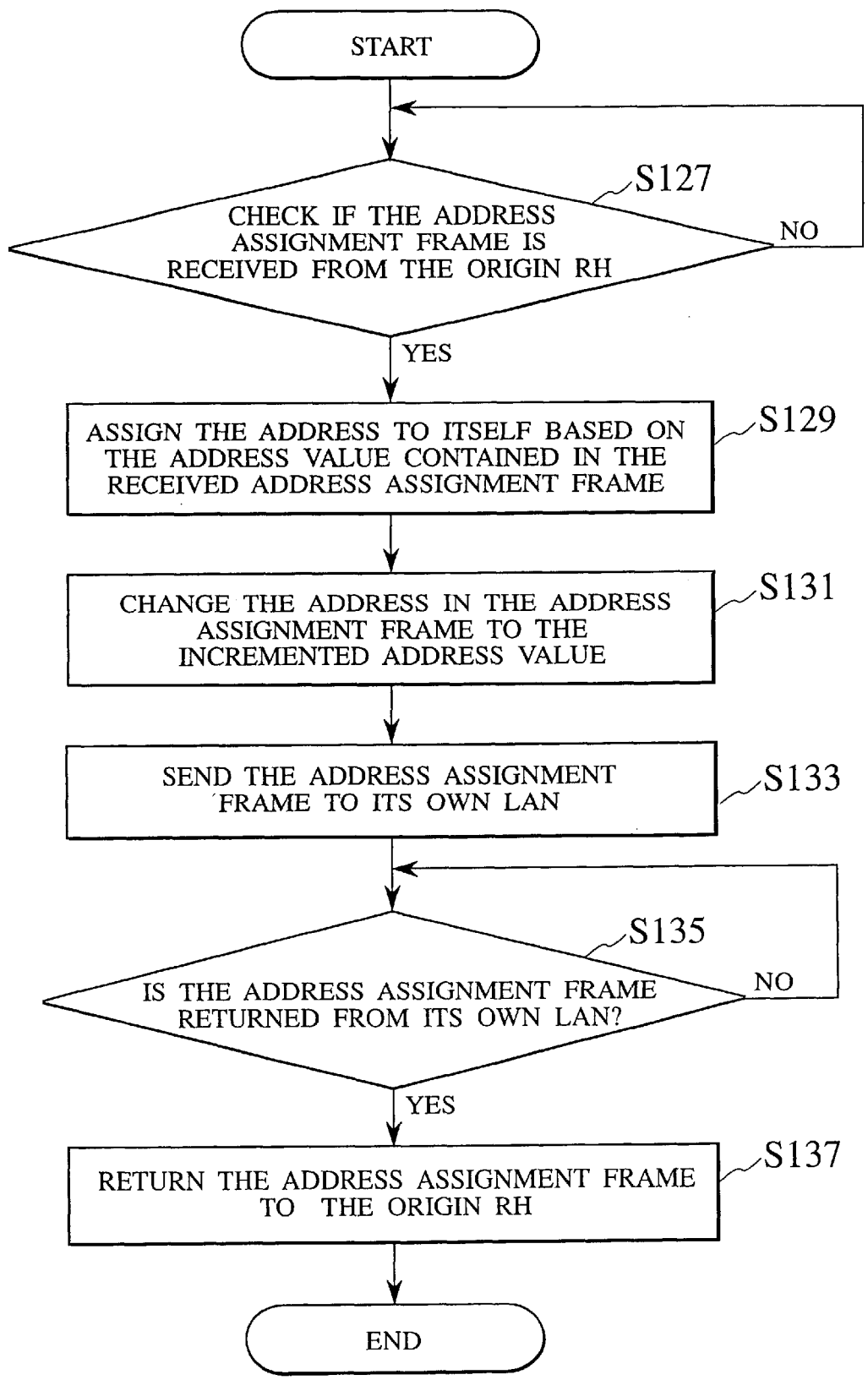
FIG. 6 is a flowchart showing the address assignment procedure for another of the route hubs performing the gateway function.

Next, in the flowchart in FIG. 5, each of route hubs RH1, RH2, and RH3 checks if it receives the address assignment frame from the upstream RH (step S117) and, if it receives the address assignment frame, extracts the address value from the address assignment frame (step S119).

The route hub increments the address value by one successively and assigns the successively incremented address value to its own route hub and to the node terminals connected to the route hub (step S121). After that, the route hub changes the address value contained in the address assignment frame to the last incremented value (step S123) and sends the address assignment frame to the downstream RH (step S125).

As shown in FIG. 7, as a result of the above steps, the RH address '01' is assigned to route hub RH1 belonging to the first LAN 3, and the node address '02' is assigned to node terminal N1 connected to route hub RH1. Then, the RH address '03' is assigned to route hub RH2, and the node address '04' is assigned to node terminal N2 connected to route hub RH2. In addition, the RH address '05' is assigned to route hub RH3, and the node address '06' is assigned to the node terminal N3 connected to route hub RH3.

Next, in FIG. 4, the first frame receiving unit 37a in the route hub RH4 checks if the address assignment frame is returned from the first LAN 3 via the first input buffer 35a. If the address assignment frame is returned, route hub RH4 assigns the address to itself based on the address value contained in the received address assignment frame (step S109). In this case, as shown in FIG. 7, the RH address '07' is assigned to route hub RH4, and the node address '08' is assigned to node terminal N4 connected to route hub RH4.

The RH address '07' assigned to route hub RH4 is also stored in the first storage unit 41a. In addition, the first frame sending unit 31a sends the address assignment frame containing the address value '08' to the route hub RH6 via the second output buffer 33b and the data transmission line 23 (step S111).

Next, in FIG. 6, the second frame receiving unit 37b in the route hub RH6 checks if the address assignment frame is received from the origin RH (root hub RH4) via the fourth input buffer 35d (step S127). If the address assignment frame is received, route hub RH6 assigns the address to itself based on the address value '08' contained in the received address assignment frame (step S129).

In this case, as shown in FIG. 7, the RH address '10' is assigned to route hub RH6, and the node address '11' is assigned to node terminal N6 connected to route hub RH6. The RH address. '10' assigned to route hub RH6 is stored in the second storage unit 41b.

Then, the address value contained in the address assignment frame is changed to the incremented address value '11' (step S131), and the second frame sending unit 31b sends the address assignment frame containing the address value '11' to the second LAN 5 in the clockwise direction via the third output buffer 33c (step S133).

Next, the address assignment processing for route hubs RH6, RH7, RH8, and RH9 and node terminals N6, N7, N8, N9, and N10 is the same as that shown in the flowchart in FIG. 5. Therefore, the detailed description is omitted here.

As a result of the above processing, the RH address '12' is assigned to route hub RH7 of the second LAN 5, the node address '13' is assigned to node terminal N7 connected to route hub RH7, and the node address '14' is assigned to node terminal N8, as shown in FIG. 7. Then, the RH address '15' is assigned to route hub RH8, and the node address '16' is assigned to node terminal N9 connected to route hub RH8. Then, the RH address '17' is assigned to route hub RH9, and the node address '18' is assigned to node terminal N10 connected to route hub RH9.

Next, the second frame receiving unit 37b checks if the address assignment frame is received from the upstream of the second LAN 5 via the third input buffer 35c (step S135). If the address assignment frame is received, the second frame sending unit 31b returns the address assignment frame to route hub RH4, which is the origin RH, via the fourth output buffer 33d and the data transmission line 27 (step S137).

Moreover, as shown in FIG. 4, the first frame receiving unit 37a of route hub RH4 checks if the address assignment frame is received from the route hub RH6 via the second input buffer 35b (step S113). If the address assignment frame is received, route hub RH4 erases the address assignment frame and finishes the address assignment processing (step S115).

As described above, route hub RH4 sends the address assignment frame, which contains the address value, to the first LAN 3 in the clockwise direction and, using the address value, assigns addresses to the route hubs and the node terminals sequentially from route hub RH1, which is nearest to route hub RH4, to route hub RH4 itself. When the address assignment frame is returned, route hub RH4 sends it to route hub RH6. Upon receiving the address assignment frame from route hub RH4, route hub RH6 assigns the address value contained in the received address assignment frame to itself, sends the address assignment frame to the second LAN 5 in the clockwise direction, and, using the address value, assigns addresses to the route hubs and the node terminals sequentially from route hub RH7 that is nearest to route hub RH6. When the address assignment frame is returned, route hub RH6 returns it to route hub RH4.

That is, addresses are assigned to the route hubs RH and node terminals N in the first LAN 3 and second LAN 5 automatically and easily by assuming a one-loop transmission route, as shown in FIG. 2, for the whole communication system including the first LAN 3, second LAN 5, data transmission line 23, and data transmission line 27.

Figure 8:
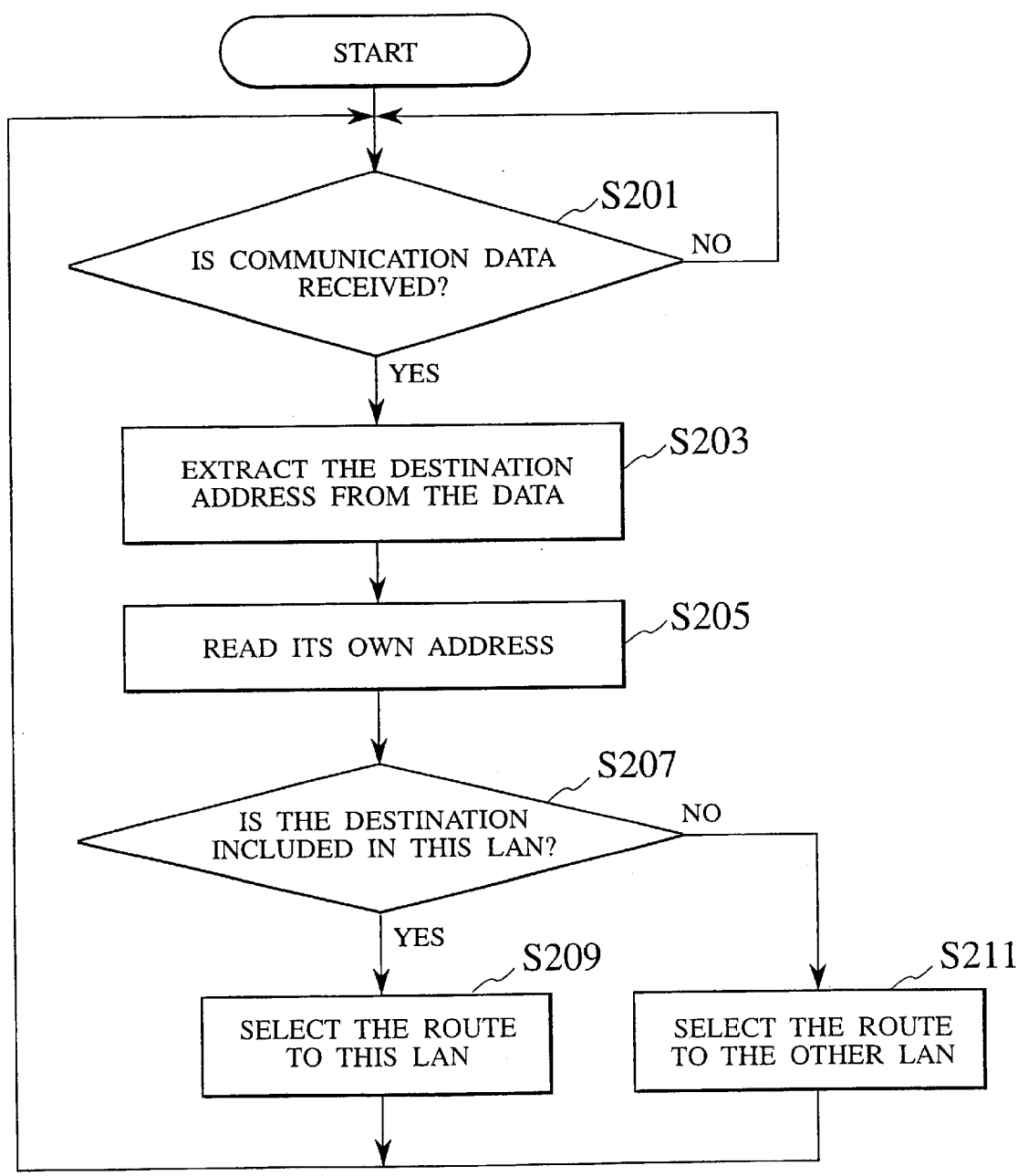
FIG. 8 is a flowchart showing the communication operation of the communication system according to the present invention.
Figure 9:
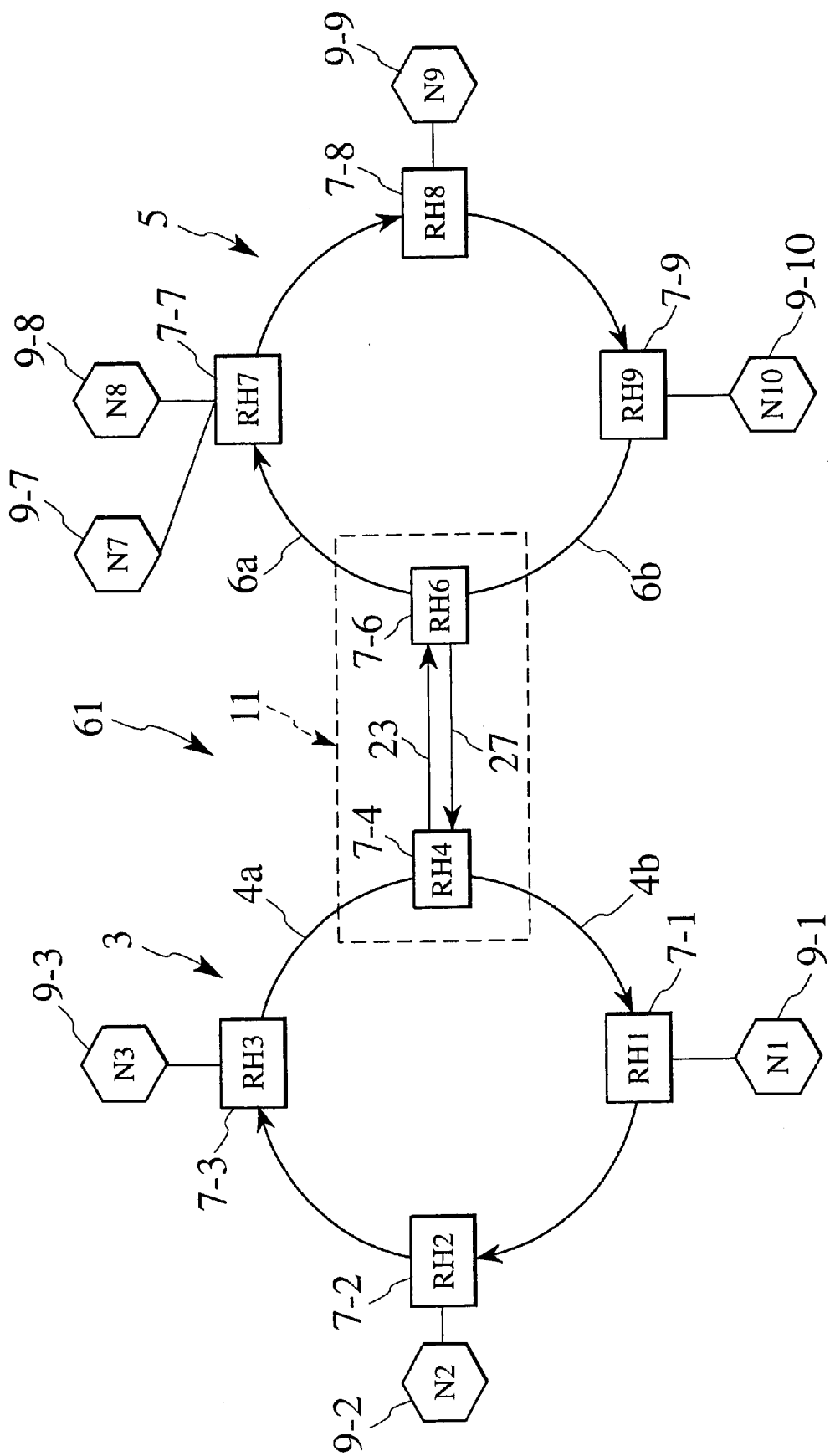
FIG. 9 is an overall block diagram showing the configuration of the communication used in a second embodiment of the present invention.
Figure 10:
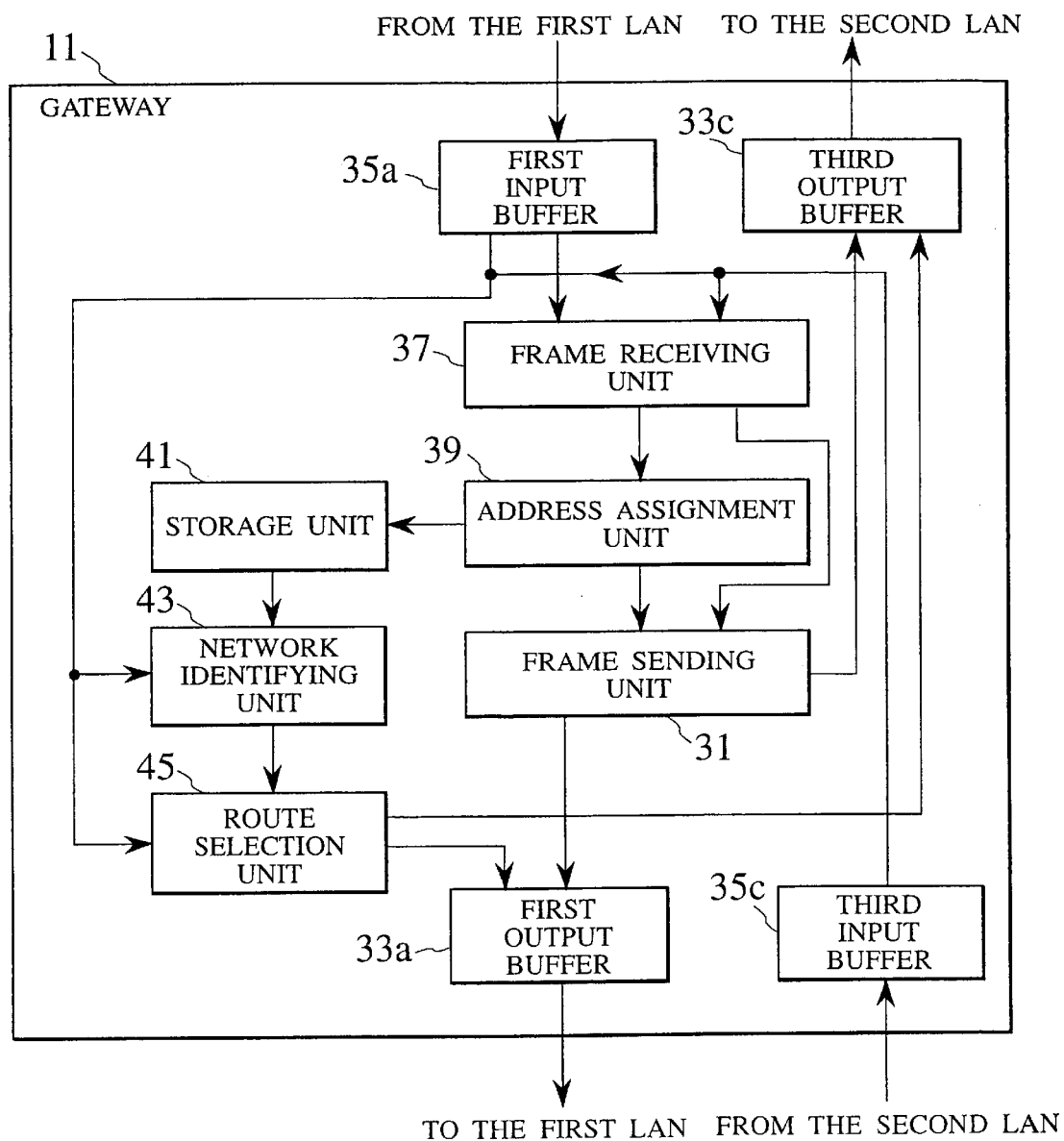
FIG. 10 is a block diagram showing the main part of the communication system used in the second embodiment of the present invention.

Next, referring to FIG. 8, the operation of the communication system composed of the route hubs RH and node terminals N in the first LAN 3 and second LAN 5, to which addresses have been assigned, will be described. The operation of route hub RH4 and route hub RH6 that have the gateway function will be described.

First, route hub RH4 constantly checks if communication data is sent from a node terminal N or a route hub RH in the first LAN 3 (step S201). If communication data is received, route hub RH4 decodes the source/destination address contained in the communication data.

Route hub RH4 extracts the destination address from the decoded source/destination address (step S203), and the first network identifying unit 43a reads its own address stored the first storage unit 41a (step S205). Then, the first network identifying unit 43a compares the destination address with its own address stored in the first storage unit 41a to check if the destination is included in this LAN (step S207). Based on the result of the checking, the first route selection unit 45a selects an appropriate route as the destination of communication data.

In this case, the address of route hub RH4 is the largest address in the first LAN 3, as shown in FIG. 7. Therefore, if the destination address of the communication data is equal to or smaller than the address of route hub RH4, it is found that the destination is in the first LAN 3. In this case, the first route selection unit 45a selects the first output buffer 33a to select the route to this LAN as the destination of the communication data (step S209). Therefore, the communication data is sent to the first LAN 3 via the first output buffer 33a.

On the other hand, if the destination address of the communication data is larger than the address of route hub RH4, it is found that the destination is in the second LAN 5. In this case, the first route selection unit 45a selects the second output buffer 33b to select the route to the other LAN as the destination of the communication data (step S211). Therefore, the communication data is sent to the second LAN 5 via the second output buffer 33b and the data transmission line 23.

The operation of route hub RH6 is the same as that of route hub RH4. The address of route hub RH6 is the smallest address in the second LAN 5, as shown in FIG. 7. Therefore, if the destination address of the communication data is equal to or larger than the address of route hub RH6, it is found that the destination is in the second LAN 5. In this case, the second route selection unit 45b selects the third output buffer 33c to select the route to this LAN as the destination of the communication data. Therefore, the communication data is sent to the second LAN 5 via the third output buffer 33c.

On the other hand, if the destination address of the communication data is smaller than the address of RH6, it is found that the destination is in the first LAN 3. In this case, the second route selection unit 45b selects the fourth output buffer 33d to select the route to the other LAN as the destination of the communication data. Therefore, the communication data is sent to the first LAN 3 via the fourth output buffer 33d and the data transmission line 27.

As described above, assigning sequential addresses to the route hubs and node terminals connected via a loop-type data transmission line such as the one shown in FIG. 2 automatically assigns addresses. In addition, when route hub RH4 or RH6 receives communication data, a check is made to see if the destination address is equal to, larger than, or smaller than the assigned address of route hub RH4 or route hub RH6. This makes it possible to determine which LAN, first LAN 3 or second LAN 5, the destination of the communication data belongs to. Therefore, this system sends communication to the specified destination reliably. As a result, this system allows communication data to be sent reliably to the destination while significantly increasing the per-unit-time data transmission amount.

<Second embodiment>

Next, a communication system 61 used in a second embodiment according to the present invention will be described with emphasis on the difference between the communication system 1 in the first embodiment and the communication system 61. In the description of the communication system 61 used in the second embodiment, the numbers of components in the communication system 61 in the second embodiment corresponding to those in the first embodiment are the same and the description of such components are not repeated.

The communication system 61 is characterized in that the first LAN 3 and the second LAN 5 are directly connected by a gateway 11 which has the gateway function of route hub RH4 and route hub RH6 described in the first embodiment.

The gateway 11 comprises a frame sending unit 31, the first output buffer 33a, the first input buffer 35a, a frame receiving unit 37, an address assignment unit 39, the third output buffer 33c, and the third input buffer 35c. The frame sending unit 31 has the function of the first frame sending unit 31a and the second frame sending unit 31b shown in FIG. 3. The frame receiving unit 37 has the function of the first frame receiving unit 37a and the second frame receiving unit 37b shown in FIG. 3.

The gateway 11 further comprises a storage unit 41 in which its own address and the addresses of a plurality of node terminals N connected to this gateway, both of which are assigned by the address assignment unit 39, are stored, a network identifying unit 43 that checks which LAN, first LAN 3 or second LAN 5, the destination belongs to based on the destination address contained in the communication data received from a node terminal N or a route hub RH in the first LAN 3 or second LAN 5, and a route selection unit 45 that selects an appropriate route as the destination of the communication data based on the network identification result to send the communication data via the selected route.

That is, the gateway 11 has two functions: one is the function which receives communication data from a node terminal N or a route hub RH in the first LAN 3 and switches the destination of the received communication data to this first LAN 3 or the second LAN 5, and the other is the function which receives communication data from a node terminal N or a route hub RH in the second LAN 5 and switches the destination of the received communication data to this second LAN 5 or the first LAN 3.

In the communication system 61 in the second embodiment which is configured as described above, the gateway 11 sends the address assignment frame, which contains an address value, to the first LAN 3 in the clockwise direction and, using the address value, assigns addresses to the route hubs, node terminals, and gateway 11 itself sequentially from route hub RH1, which is nearest to gateway 11, to gateway 11 itself. Then, the gateway 11 sends the address assignment frame to the second LAN 5 in the clockwise direction and, using the address value, assigns addresses to the route hubs and node terminals sequentially from route hub RH7 that is nearest to gateway 11.

That is, because the gateway 11 has both the function of route hub RH4 and the function of route hub RH6, addresses may be assigned automatically to the route hubs RH and node terminals in the same way addresses are assigned in the communication system in the first embodiment. In this case, because the data transmission lines 23 and 27, second output buffer 33*b*, fourth output buffer 33*d*, second input buffer 35*b*, and fourth input buffer 35*d* are not provided, the configuration becomes simpler and, at the same time, addresses may be assigned more quickly.

In addition, when the gateway 11 receives communication data containing an address, the gateway 11 checks if the destination address of the communication data is equal to, larger than, or smaller than its own address to find which LAN, first LAN 3 or second LAN 5, the communication data is addressed to. Therefore, the communication data may be sent reliably to the specified destination and, as a result, data may be exchanged easily between the first LAN 3 and the second LAN 5 as in the first embodiment.

It is to be understood that the present invention is not limited to the embodiments described above. Although, in the first and second embodiments, addresses are assigned sequentially to the route hubs RH and node terminals N belonging to the loop-type first LAN 3 and second LAN 5 in the clockwise direction, addresses may be assigned sequentially to the route hubs and node terminals in the counterclockwise direction.

In addition, although, in the first and second embodiments, addresses are assigned sequentially to the route hubs and node terminals in the clockwise direction while incrementing the address by 1 beginning at 1 (1, 2, 3, . . . ), addresses may be assigned to the route hubs and node terminals while decrementing the address by 1 beginning at 18 (18, 17, 16, . . . ).

Moreover, although, in the first and second embodiments, addresses are assigned sequentially to the route hubs and node terminals while incrementing the address by 1 beginning at 1 (1, 2, 3, . . . ), a plurality of addresses, each of which corresponds to a route hub RH or a node terminal N, may be stored in advance in the address assignment frame. In this configuration, each route hub RH and each node terminal N may extract the corresponding address value for its own sequential address.

Furthermore, node terminal dependent addresses, such as those, for example, which are at maximum twice as large as an address assigned, in advance, to each type of node terminals connected to the route hubs may be assigned as addresses.

In addition, although a communication medium such as a communication line is used for the data transmission lines 23 and 27 when the first LAN 3 and the second LAN 5 are remotely located as in the first embodiment, it is to be readily understood that not only the communication line but also an infrared ray or an electromagnetic wave may be used as the communication medium. It should also be understood that various changes and modifications may be made in the present invention within the spirit and scope as set out in the accompanying claims.

What is claimed is:

1. A communication method for exchanging data between node terminals, between routers, or between a node terminal and a router using a communication system composed of a pair of networks each comprising a plurality of routers each having one or more said node terminals, said plurality of routers being connected via a first data transmission line, said pair of networks being connected via a pair of routers belonging to said pair of networks respectively and a second data transmission line connecting said pair of routers, said communication method comprising the steps of:

causing one of said pair of routers to send into one direction an address assignment frame containing an address value to one of said pair of networks, to assign an address to each router and each node terminal, based on said address value, sequentially from the router, which is nearest to said one of pairs of routers, to said one of pairs of routers itself, and to send said address assignment frame, which has been returned, to the other router of said pair of routers; and causing the other router of said pair of routers to assign the address to itself based on the address value contained in said received address assignment frame, to send said address assignment frame to the other network into said one direction, to assign the address to each router and each node terminal, based on said address value, sequentially from the router which is nearest to the other router, and to return said address assignment frame, which has been returned, to said one of said pair of routers.

2. The communication method according to claim 1 wherein each of said routers adds at least a destination address to communication data to be sent and sends the communication data containing the destination address to a destination and wherein each of said pair of routers checks, based on the destination address contained in received communication data and the address assigned to itself, if the destination is included in the network to which said router itself belongs, selects, based on a result of the checking, a route via which the communication data is to be sent, and sends the communication data to the destination via the selected route.

3. The communication method according to claim 1 wherein, when assigning the address to each of said routers and said node terminals, each of said pair of routers increments or decrements the address.

4. A communication system which is composed of a pair of networks each comprising a plurality of routers each having one or more node terminals and in which data is exchanged between said node terminals, between said routers, or between a node terminal and a router, said plurality of routers being connected via a first data transmission line, said pair of networks being connected via a pair of routers belonging to said pair of networks respectively and a second data transmission line connecting said pair of routers, wherein one of said pair of routers has first address assignment means for sending into one direction an address assignment frame containing an address value to one of said pair of networks, for assigning an address to each router and each node terminal, based on said address value, sequentially from the router, which is nearest to said one of pairs of routers, to said one of pairs of routers itself, and for sending said address assignment frame, which has been returned, to the other router of said pair of routers; and wherein the other router of said pair of routers has second address assignment means for assigning the address to itself based on the address value contained in said received address assignment frame, for sending said address assignment frame to the other network into said one direction, for assigning the address to each router and each node terminal, based on said address value, sequentially from the router which is nearest to the other router, and for returning said address assignment frame, which has been returned, to said one of said pair of routers.

5. The communication system according to claim 4 wherein each of said routers has sending means for adding at least a destination address to communication data to be sent and for sending the communication data containing the destination address to a destination and wherein each of said pair of routers comprises:
storing means for storing its own address that is assigned;
checking means for checking, based on the destination address contained in received communication data and its own address stored in said storing means, if the destination is included in the network to which said router itself belongs; and
route selection means for selecting, based on a result of the checking, a route via which the communication data is to be sent and for sending the communication data to the destination via the selected route.

6. The communication system according to claim 4 wherein, when assigning the address to each of said routers and said node terminals, each of said pair of routers increments or decrements the address.

7. A communication method for exchanging data between node terminals, between routers, or between a node terminal and a router using a communication system composed of a pair of networks each comprising a plurality of routers each having one or more said node terminals, said plurality of routers being connected via a data transmission line, said pair of networks being connected via a gateway, said communication method comprising the steps, by said gateway, of:

sending into one direction an address assignment frame containing an address value to one of said pair of networks;

assigning an address to each router, each node terminal, and said gateway itself, based on said address value, sequentially from the router, which is nearest to said gateway, to said gateway itself;

sending said address assignment frame to the other network into said one direction; and assigning the address to each router and each node terminal, based on said address value, sequentially from the router which is nearest to said gateway.

8. The communication method according to claim 7
wherein each of said routers adds at least a destination address to communication data to be sent and sends the communication data containing the destination address to a destination and wherein said gateway checks, based on the destination address contained in received communication data and the address assigned to the gateway itself, which network the destination belongs to, selects, based on a result of the checking, a route via which the communication data is to be sent, and sends the communication data to the destination via the selected route.

9. The communication method according to claim 7 wherein, when assigning the address to each of said routers, each of said node terminals, and said gateway, said gateway increments or decrements the address.

10. A communication system which is composed of a pair of networks each comprising a plurality of routers each having one or more node terminals and in which data is exchanged between said node terminals, between said routers, or between a node terminal and a router, said plurality of routers being connected via a data transmission line, said pair of networks being connected via a gateway, wherein said gateway has address assignment means for sending into one direction an address assignment frame containing an address value to one of said pair of networks, for assigning an address to each router, each node terminal, and said gateway itself, based on said address value, sequentially from the router, which is nearest to said gateway, to said gateway itself, for sending said address assignment frame to the other network into said one direction, and for assigning the address to each router and each node terminal, based on said address value, sequentially from the router which is nearest to said gateway.

11. A gateway for use in a communication system in which a pair of networks, each comprising a plurality of routers each having one or more said node terminals, are connected so that data may be exchanged between said node terminals, between said routers, or between a node terminal and a router, said plurality of routers being connected via a data transmission line, said gateway comprising:

address assignment means for sending into one direction an address assignment frame containing an address value to one of said pair of networks, for assigning an address to each router, each node terminal, and said gateway itself, based on said address value, sequentially from the router, which is nearest to said gateway, to said gateway itself, for sending said address assignment frame to the other network into said one direction, and for assigning the address to each router and each node terminal, based on said address value, sequentially from the router which is nearest to said gateway;

storing means for storing its own address assigned by the address assignment means;

checking means for checking, based on the destination address contained in received communication data and its said own address stored in said storing means, which network the destination belongs to; and route selection means for selecting, based on a result of the checking, a route via which the communication data is to be sent, and for sending the communication data to the destination via the selected route.

* * * * *